United States Patent [19]

Blunt

[11] Patent Number: 5,651,070
[45] Date of Patent: Jul. 22, 1997

[54] WARNING DEVICE PROGRAMMABLE TO BE SENSITIVE TO PRESELECTED SOUND FREQUENCIES

[76] Inventor: Thomas O. Blunt, 2700 Poplar Hill Ct., Louisville, Ky. 40299

[21] Appl. No.: 420,414

[22] Filed: Apr. 12, 1995

[51] Int. Cl.$^6$ ........................................... H04R 29/00
[52] U.S. Cl. ........................................ 381/56; 340/407.1
[58] Field of Search ........................ 381/56, 57; 340/407, 340/566

[56] References Cited

U.S. PATENT DOCUMENTS

| | | |
|---|---|---|
| 4,297,677 | 10/1981 | Lewis et al. ........................ 340/566 |
| 4,558,459 | 12/1985 | Noso et al. ........................ 381/57 |
| 4,731,603 | 3/1988 | McRae et al. . |
| 4,853,674 | 8/1989 | Kiss . |
| 5,381,129 | 1/1995 | Boardman . |

*Primary Examiner*—Curtis Kuntz
*Assistant Examiner*—Vivian Chang

[57] ABSTRACT

A listening device for alerting an individual unable to hear warning signals having a means for prerecording a warning signal, converting the signal into digital information, and storing the digital information. The device further includes a means for continuously comparing the digital information to ambient sound information converted into ambient digital information and a means for alerting the individual with an alerting signal when the digital information matches the ambient digital information corresponding to the warning signal.

8 Claims, 3 Drawing Sheets

WARNING DEVICE PROGRAMMABLE TO BE SENSITIVE TO PRESELECTED SOUND FREQUENCIES

BACKGROUND OF THE INVENTION

This invention relates to warning devices for the hearing impaired or for those working in an environment where warning sounds are hidden by ambient noise and that provide non-auditory type signals to the users.

Presently there are available warning devices that respond to a warning sound such as the buzzing of a smoke detector, the ringing of a telephone, the honking of a car horn and the like by providing a noticeable signal such as visible light or a vibration to a wearer of the device. Such devices are particularly useful for the hearing impaired. U.S. Pat. No. 3,786,628 to Fossard et al issued Jan. 22, 1974 describes such a device that, for example, may be connected to an alarm clock, placed under a pillow, and provides a vibration to the user when the alarm of the clock is activated. Still another U.S. Pat. No. 4,297,677 issued Oct. 27, 1981 to Lewis et al pertains to a portable device that can detect changes in the ambient sound level produced for example, by a warning sound superimposed on the ambient sound level and produces a visible light or some tactile sensation to alert the wearer of the device that the change in the sound level has occurred. Other prior art devices such as that described in U.S. Pat. No. 4,731,603 comprise a transmitter unit that responds to a warning signal and transmits a communication signal in the form of infrared light or a high frequency sound to a receiver worn by a user. The transmitter then in turn alerts the wearer through vibration. In U.S. Pat. No. 4,853,674, a system having a plurality of transmitter modules each associated with and monitoring the output of some signalling device can be used to alert the user that one of the monitored events has occurred.

The frequencies of telephone rings, alarms, and smoke detectors may vary considerably from one location to another often have different frequencies. None of the prior art devices, however, has the capability of being adapted to be used with a variety of different type of warning sounds that might be expected at such various locations. Thus, it would be highly advantageous to have a portable device that could effectively memorize a particular warning sound and then alert the user that the memorized warning sound has occurred. Such a device would have great application for people who travel, for example, and wish to be alerted that the phone in a hotel room is ringing or the smoke alarm is sounding. It would be further advantageous to have a portable device that could memorize and distinguish between a plurality of warning sounds and alert the user which sound is occurring. Finally, it would be still more advantageous to have a portable sound detecting device that could memorize a warning sound and distinguish that sound from ambient sound levels and alert the user of the occurrence of the sound.

SUMMARY OF THE INVENTION

These and other advantages are obtained by a method of converting selected warning sounds into digital information and storing the digital information, then continuously monitoring and comparing ambient sounds to the stored digital information, and finally providing an alerting signal when a match is determined to exist between the stored digital information and the ambient sound being monitored. In another embodiment of the present invention, a listening device constructed in accordance with the present invention is capable of being programmed to record selected sounds into corresponding digital information. The listening device further includes (1) a comparison means for continuously comparing ambient sounds converted into digital form to the corresponding digital information and (2) a component for providing an alerting signal in response to an identification signal received from said comparison means when the ambient digital information matches the corresponding digital information.

DETAILED DESCRIPTION OF THE PREFERRED EMBODIMENT

Figure 1:
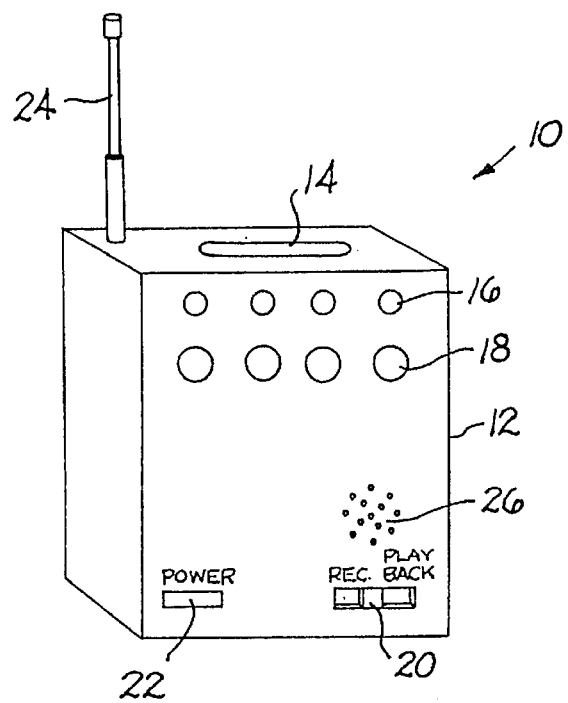
FIG. 1 is a perspective of the housing of a listening device constructed in accordance with the present invention.

Reference is first made to the perspective of FIG. 1 in which is shown a housing 12 housing a listening device illustrated generally by the character numeral 10. Briefly, with a more detailed description being provided below, it may be seen that housing 12 includes components capable of being programmed to record warning sounds of four different sources such as the ringing of a phone, buzzing of a door bell, the whistle of a smoke detector, or the sound of a security alarm. High intensity lamp 14 indicates to a user when an alarm sound has occurred while indicating lights 16 indicate to the user which of the alarms have occurred. A plurality of pressure switches 18 permit selection of various channels for recording of the selected warning signals.

A switch 20 places the device in either a recording mode in which the various warning sounds of interest can be converted into digital information and stored or in a listening mode in which the device is ready to compare ambient sounds to the recorded digital information and indicate when a match has occurred. A power switch 22 is available to activate or inactivate the device as desired. Finally, the device may act as a transmitter to a remote alerting component as illustrated by transmitting antenna 24 adapted to transmit, for example, a high frequency rf carrier to the receiver of the remote alerting component.

Figure 2:
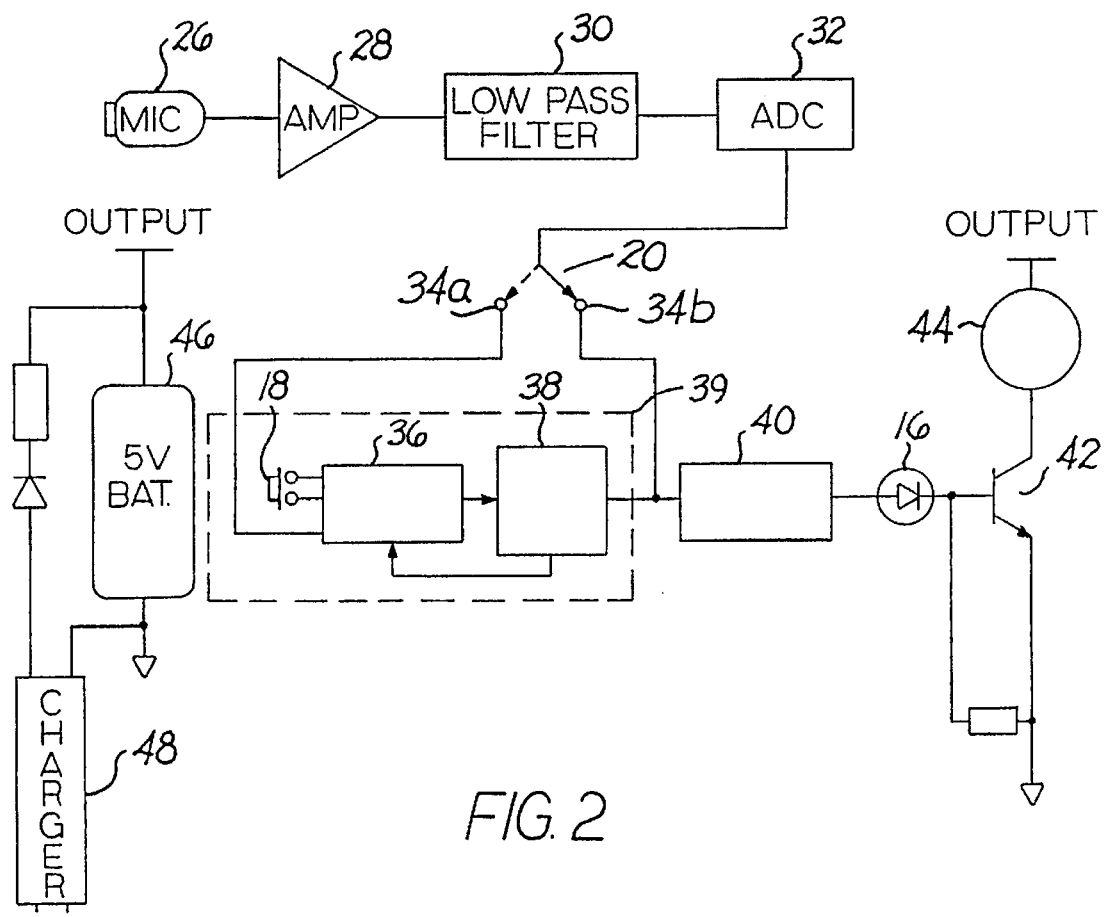
FIG. 2 is a schematic of a listening device constructed in accordance with the present invention.

A schematic of the device of the present invention is shown in FIG. 2. A microphone 26 capable of picking up the frequencies of the desired warning sounds delivers the analog signals to an amplifier 28 in turn connected to a band pass filter 30. Filter 30 is designed to filter out undesired low and high frequencies. An analog-to-digital converter 32 converts signals received from filter 26 to digital information. Converter 32 is shown connected to terminal post 34b of switch 20 and in phantom connected to terminal post 34a. In the latter position representing the device of the present invention in the recording mode, the output of converter 32 is directly connected to the input of sound processor 36 serving to compress and otherwise process the digital information for storage in microchip 38. As illustrated, processor 36 and microchip 38 form a circuit 39 (shown within the dashed lines) that continuously processes the corresponding digital information storage and reprocesses the stored digital for comparison. To activate processor 36 to process the corresponding digital information, switch 18 must be depressed so that the digital information can be properly processed for storage in microchip 38.

When switch 20 is in the listening mode illustrated by the connection to terminal post 34b, the output of converter 32 is connected to a first input to a comparitor 40 delivering ambient sound in the form of a digital signal. The second input is connected to the output of sound processor 36. When device 10 is in the listening mode, the corresponding processed digital information in microchip 38 is continuously being addressed out to sound processor 36, reprocessed, and fed to comparitor 40. Comparitor 40 continuously compares the corresponding digital information to the ambient digital information. Should the comparitor 40 determine a match exists between the sets of digital information, it provides an output signal indicative that an alarm sound has occurred. The output of comparitor 40 is tied through indicating light 16, for example, a light emitting diode (LED), to a power transistor 42. When comparitor 40 provides an "identification" signal indicating a match, device 10 is placed in an alerting mode. In this mode, LED 16 is activated by the output or identification signal of comparitor 40. An alerting component 44 tied to the output of drive transistor 42 alerts the user through any of various non-auditory warning signals that a match has occurred and a warning sound is present. For example, the alerting component could be connected to high intensity lamp 14 that rapidly blinks on and off or, alternatively, a vibrator positioned adjacent the user. To reset device 10 from its alerting mode back into its listening mode, the user may temporarily put switch 20 to contact terminal 34a or in the recording mode, so that no ambient digital information is passed as an input to the comparitor 40. Assuming the warning sound is no longer present to place device 10 in the alerting mode, device 10 via switch 20 then can be switched back to the listening mode until another match is determined to exist.

Device 10 can be made very compact and light, and thus is highly portable. It utilizes little power and can be driven by a small energy source such as a 5 volt battery 46 rechargeable by charger 48 as illustrated. It is suitable to carry on trips for use on trips in hotel rooms and the like where the user can program the device to memorize a desired sound such as the hotel's smoke alarm sound. Placing the device by the bed side upon retiring for the night, the user can be comforted that he or she will be alerted should the smoke alarm sound. The ability to reprogram the device at any time for varying types of sounds provides significant flexibility of use since the device responds only to a programmed sound and the program can be easily changed to respond to sounds of different frequencies.

Figure 3:
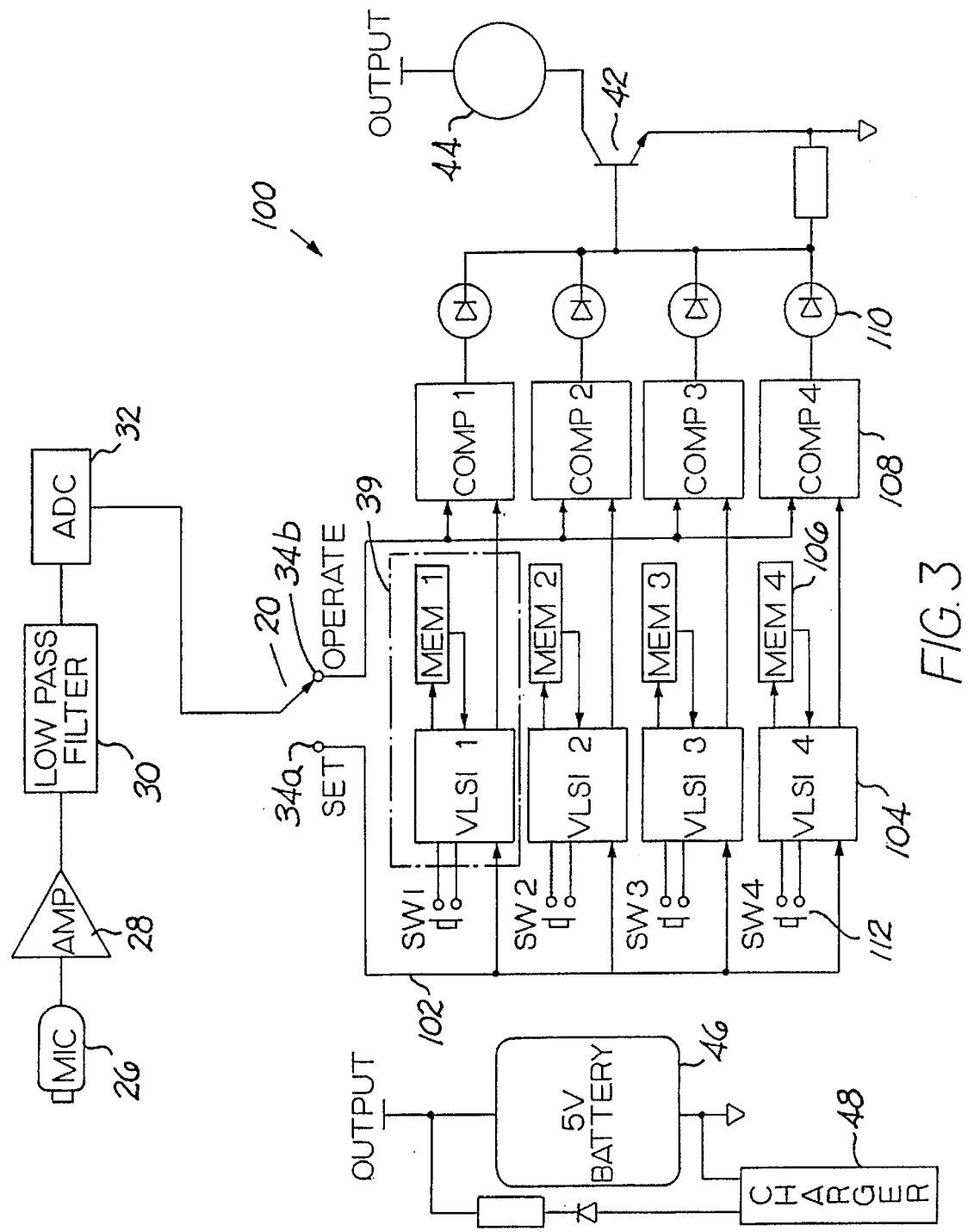
FIG. 3 is a schematic of another embodiment of a listening device constructed in accordance with the present invention having the capability of being programmed to store a plurality of digital information corresponding to separate and distinct sounds.
Figure 4:
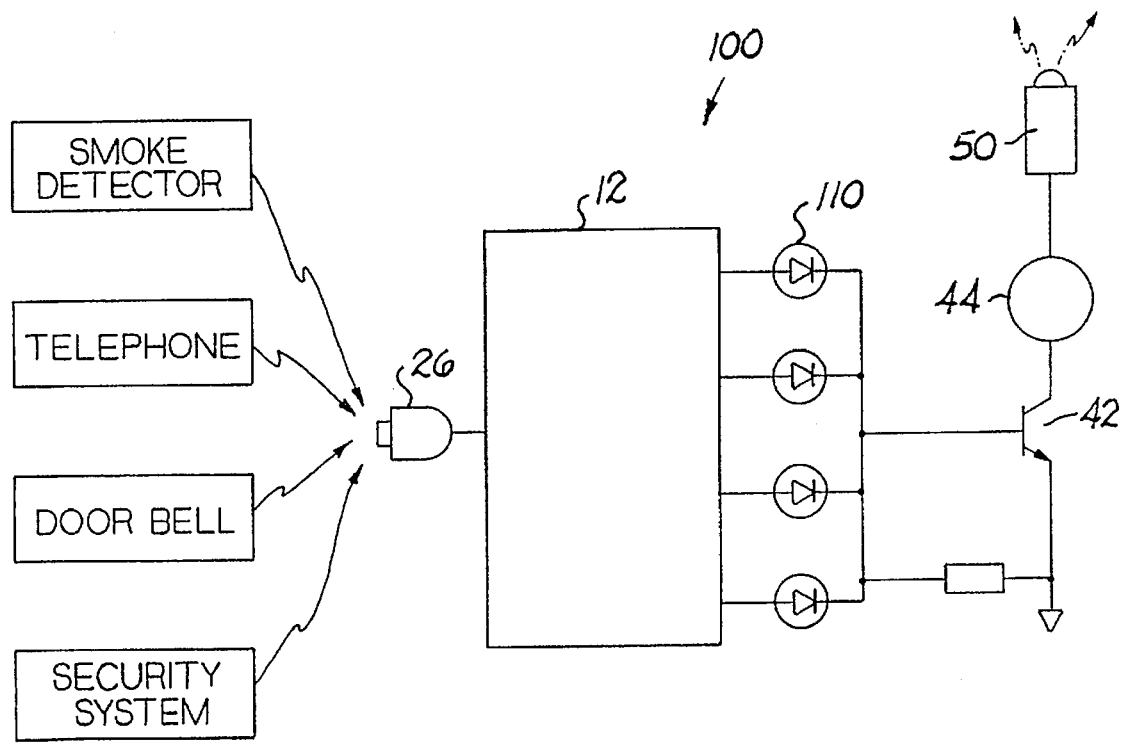
FIG. 4 is a schematic of a listening device of FIG. 3 with a direct connection between the comparing component and the alerting component.

The schematics of FIGS. 3 and 4 illustrate a multichannel device 100 that has the capability of storing a plurality of distinct corresponding digital information representing separate and different warning sounds. Device 100 is depicted as having four separate channels for the recording of up to four different sounds. Terminal post 34a of switch 20 is tied to buss 102 connected to four sound processors 104. Each sound processor 104 is connected in a circuit to an associated chip 106. The output of each sound processor 104 is connected to the input of an associated comparitor 108 in turn connected through an associated LED 110 to the input of power transistor 42 that drives alerting component 44. Thus, each channel is comprised of an associated sound processor 104, chip 106, comparitor 108 and LED 110.

| Component Table | |
|---|---|
| amplifier 28 | available as standard stock item |
| filter 30 | available as standard stock item |
| AD converter 32 | available as standard stock item |
| sound processor 36 | VLSI sound processor OkiData M6308 |
| microchip 38 | standard stock item HY53C56LS-10 |
| comparitor 40 | RCA CD 4063 |
| power transistor 42 | available as standard stock item |

In operation, a user upon arriving at a location may place device 100 in the proximity of a warning device. For example, the user may wish to program the device to record the sound of the smoke alarm in a hotel/motel room the user is occupying for the night. The proprietor of the establishment would be asked by the user to test the alarm, thus giving the user an opportunity to record the warning sound. The user sets device 100 in the record mode by placing switch 20 in the proper record position, i.e., connecting to terminal post 34a. Then, as the warning sound is occurring, the user depresses one of the switches 112 and the sound is processed and stored in the associated microchip 106. Switch 112 is released and device 100 is set in the listening mode by switch 20 connecting the output of converter 32 via terminal 34b to each input of comparitors 108.

Additional warning sounds can be recorded as desired by repeating the steps above using another of the channels. Thus, device 10 can record up to four different warning sounds. It is clear, however, that device 10 could be expanded to include as many channels as desired.

When device 110 is in its listening mode, it continuously compares the ambient digital information to the corresponding digital information coming from each circuit 39 comprising sound processors 104 and microchips 106. When one of the comparitors 108 determines a match exists, the comparitor 108 generates an identifying signal as an output causing the associated LED 110 to flash and activating alerting component 44 to provide its warning signal. The user can then identify which warning sound is being sounded from the illumination of the associated LED 110 and take whatever action is required.

Figure 5:
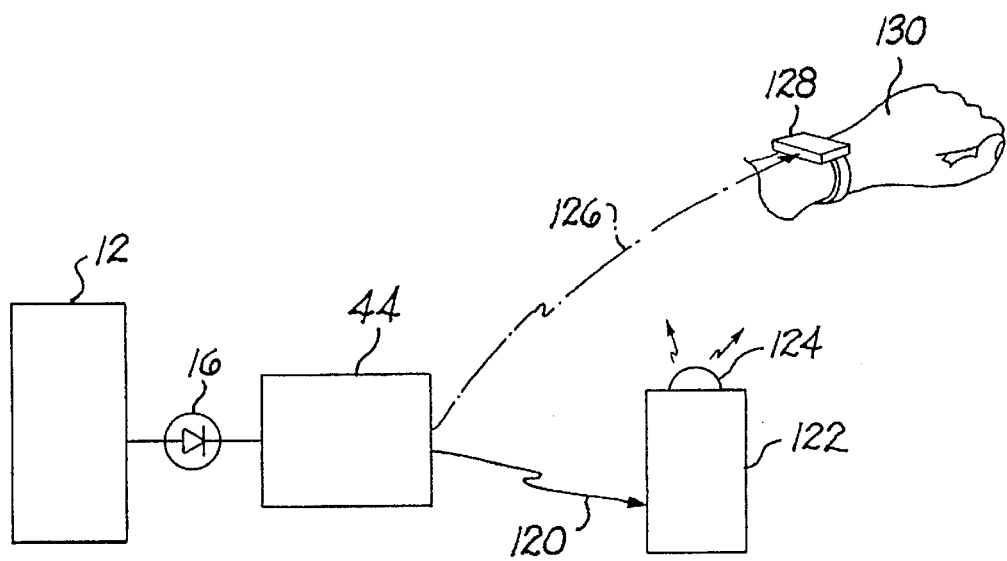
FIG. 5 is a schematic of the listening device of FIG. 1 in which the alerting component in the form of either a light source or a tactile vibrator with a receiver for receiving a signal from a transmitter associated with said comparing component.

While the device 100 is illustrated as being tied directly from warning component 44 to a light source 50 in FIG. 4, it is important to understand that, in many instances, it may be desirable to have a warning component that is remote from device 100. The schematics of FIGS. 1 and 5, however, serve to indicate that the user could be alerted by a signal transmitted from device 10 by a carrier wave of a predetermined frequency generated when a comparitor 40 provides an identifying output signal to transmitter. For example, the output of the alerting device 44 could be in the form of signal 120 to a receiver 122 having a high intensity light 124 attached thereto. Alternatively, the signal output 126 (shown in phantom) of device 44 could be to a vibrator 128 worn on the user's wrist 130. There are many such remote operated vibrating units in use today such as is clearly described in the aforementioned U.S. Pat. No. 4,297,677. Thus, a description of the specifics of such devices is not considered necessary for an understanding of the present invention.

It should also be understood that while the present invention has particular use for the hearing impaired the invention has clear application in situations where the ambient noise level may be of such a characteristic that warning sounds cannot be normally heard. Thus, a listening device in accordance with the present invention would have great application and provide significant flexibility to those working in a high noise environment, hearing impaired or not. Moreover, the compact size, light weight, and programming capability of the present invention allows the device to be easily transported and used in many types of environments where warning sounds and the ambient noise level are dramatically different. It is therefore further understood that in light of a reading of the foregoing description and drawings that those with ordinary skill in the art will be able to make changes and modifications to the present invention without departing from the spirit or scope of the invention as defined in the following appended claims.

I claim:

1. A combination listening and alerting device for providing an alerting signal to warn an individual unable to hear a selected warning sound of the occurrence of said selected warning sound, said device comparing a recorded warning signal corresponding to said selected warning sound to continuously received ambient sounds and providing an alerting signal when a match is determined between said recorded warning signal and said ambient sounds, said device comprising:

(a) means for receiving sounds;

(b) means for converting said selected warning sound received by said sounds receiving means into corresponding digital information;

(c) means for processing said corresponding digital information and storing said processed corresponding digital information;

(d) comparison means for continuously comparing ambient digital information converted by said converting means from ambient sound received by said sounds receiving means to said corresponding digital information received from said processing and storing means, said comparison means providing an identification signal when said ambient digital information matches said corresponding digital information, said device further having a recording mode and a listening mode and further including a switch means for placing said processing and storing means in communication with said sounds receiving means in said recording mode and placing said comparison means in communication with said sounds receiving means and said processing and storing means in said listening mode; and (e) an alerting component in response to the occurrence of said identification signal for providing said alerting signal thereby warning said individual of the occurrence of said selected warning sound.

2. The device of claim 1 including a transmitter for transmitting a transmission signal in response to an identification signal, said alerting component including a receiving member for receiving said transmission signal and an alerting signal generating member for generating said alerting signal in response to said receipt by said receiving member of said transmission signal.

3. The device of claim 2 in which said generating member is a vibrator that vibrates in response to said transmission signal.

4. The device of claim 2 in which said generating member is a light source that is activated in response to said transmission signal.

5. The device of claim 1 in which said alerting member is tied directly to said comparison means and includes an alerting signal generating means for generating said alerting signal in response to said identification signal.

6. The device of claim 1 including
a plurality of processing and storing means for processing and storing a respective one of a plurality of corresponding digital information each associated with a respective warning sound and
a plurality of comparison means each associated with a respective one of said processing and storing means for comparing said ambient digital information to respective corresponding digital information.

7. The device of claim 6 including a plurality of signal means each associated with a respective one of said plurality of comparison means, each of said signal means being activated when said respective one of said comparison means provides said identification signal.

8. The device of claim 7 in which said plurality of signal means is a light source.

* * * * *